July 30, 1968  R. R. TRACY  3,394,970
ELASTIC PIVOT
Filed Aug. 25, 1966  2 Sheets-Sheet 1
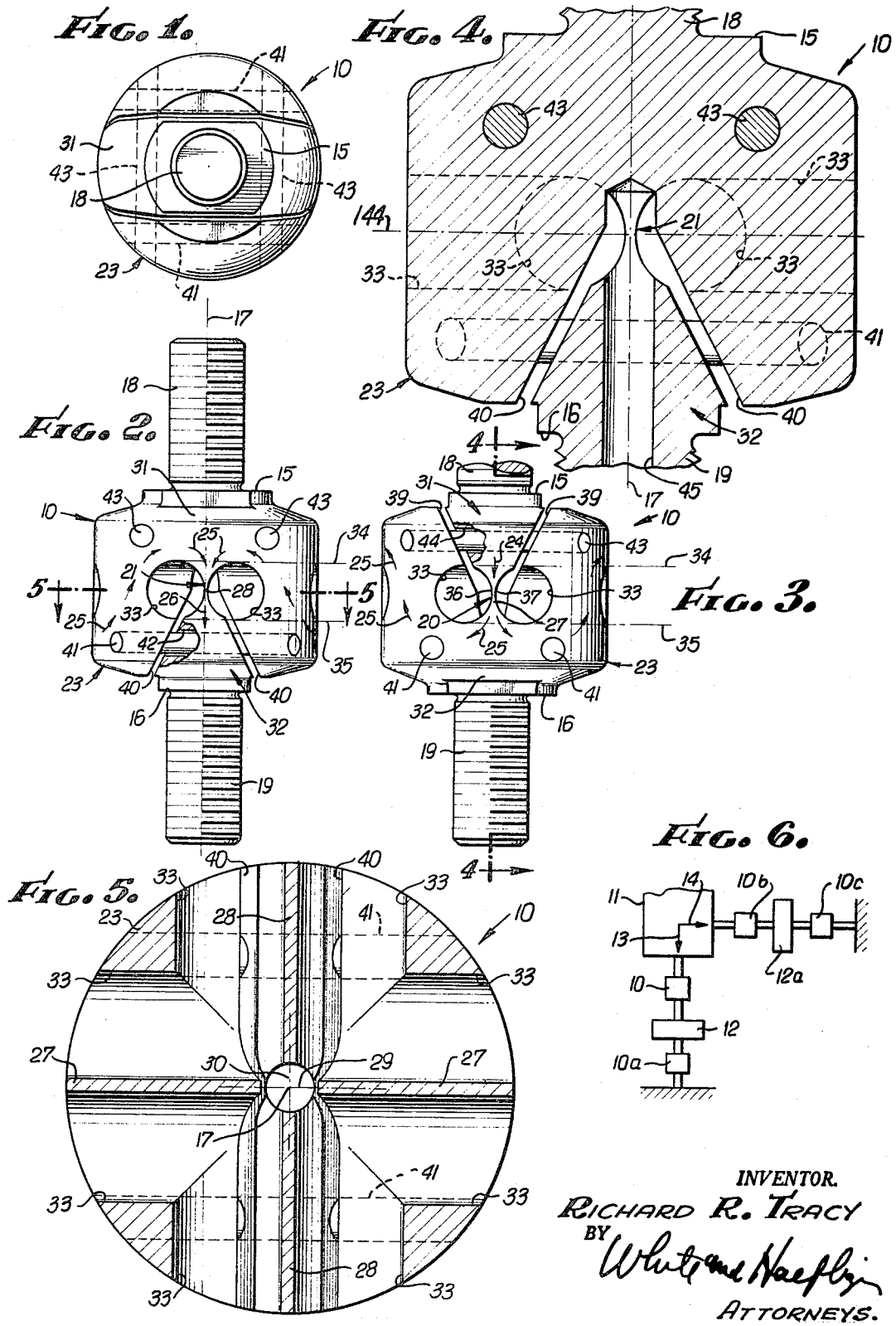
INVENTOR.
RICHARD R. TRACY
BY
Whit and Haeflin
ATTORNEYS.

July 30, 1968   R. R. TRACY   3,394,970
ELASTIC PIVOT
Filed Aug. 25, 1966   2 Sheets-Sheet 2
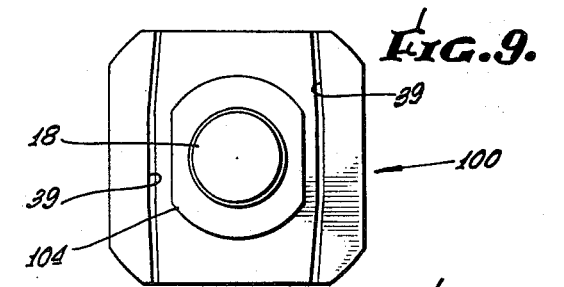
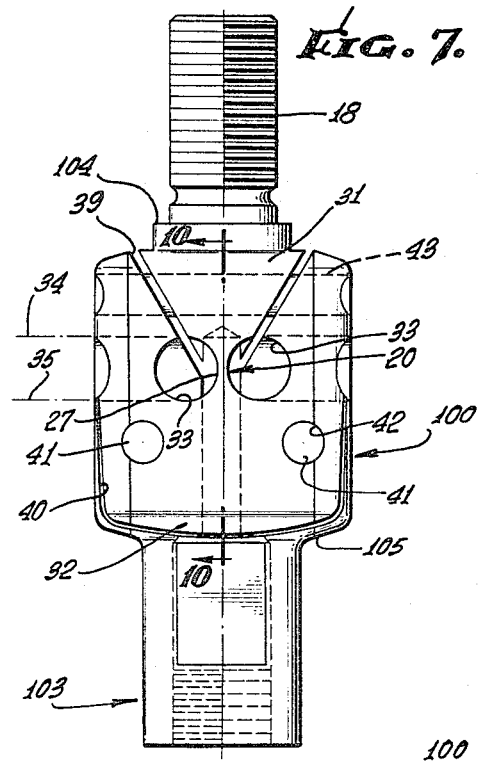
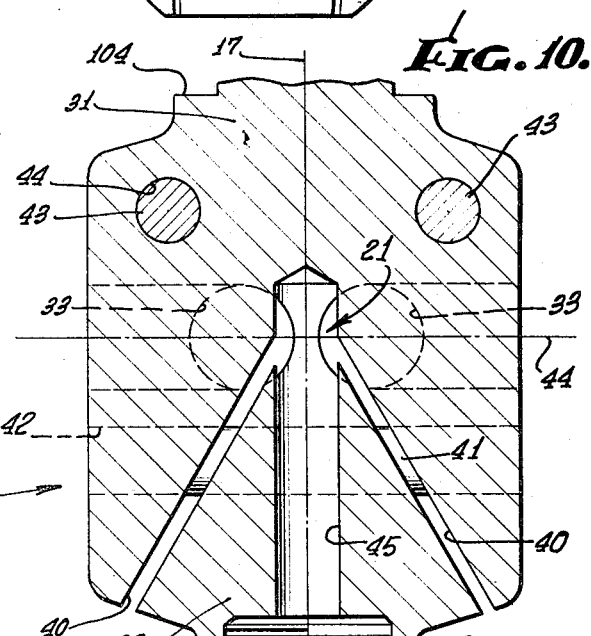
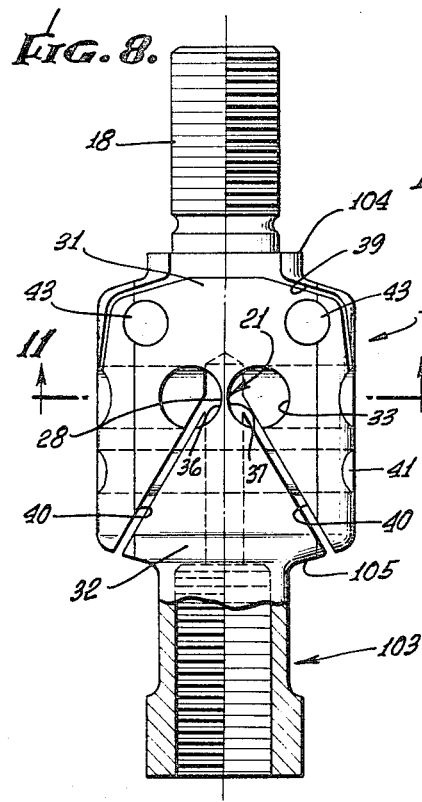
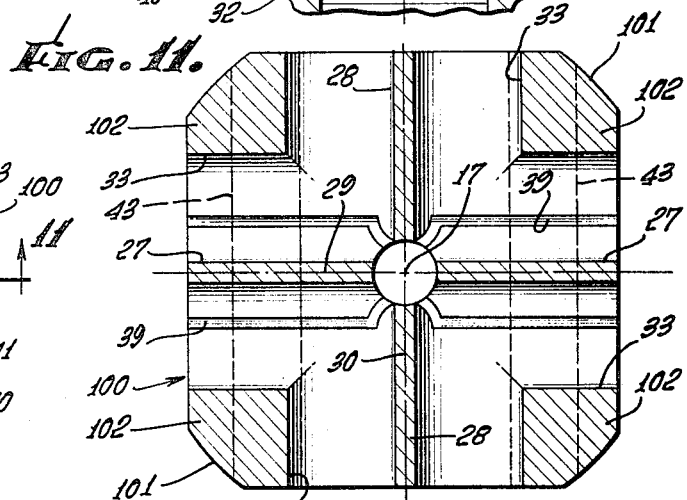
INVENTOR.
RICHARD R. TRACY
BY White & Haefliger
ATTORNEYS.

United States Patent Office 3,394,970
Patented July 30, 1968

3,394,970
ELASTIC PIVOT
Richard R. Tracy, Pasadena, Calif., assignor to The Task Corporation, Anaheim, Calif., a corporation of California
Continuation-in-part of application Ser. No. 187,869, Apr. 16, 1962. This application Aug. 25, 1966, Ser. No. 575,898
10 Claims. (Cl. 308—2)

This application is a continuation-in-part of my co-pending application, Ser. No. 187,869, entitled "Elastic Pivot," filed Apr. 16, 1962, now abandoned.

This invention relates generally to elastic pivots and more particularly has to do with a novel elastic pivot characterized as having improved load handling characteristics.

Devices of the general type with which the invention is concerned are used typically as limited motion pivots between a source of loading and load meters or sensing devices, for the purpose of transmitting only axially imposed loading to the meters, as opposed to transmitting laterally imposed loads. In other words, such devices may be characterized as acting to segregate axial from lateral loading as respects transmission thereof to the meter. These devices find wide application in force measuring and weighing systems where different meters measure longitudinal and lateral loading and are to be isolated from loading and movements other than those to be measured. The quality of such a device is therefore determined at least in part by its ability to function in this manner, and it is a major object of the invention to provide a novel device of this type which will so function in a better or more efficient manner particularly as respects the amount of loading which the device will handle without failure, for a given overall size of the device.

As broadly conceived, the improved elastic pivot comprises a body having opposite ends longitudinally spaced apart in the direction of the body axis to receive application of force, the body also having web means and body intermediate extent for transmitting axially imposed force between the body ends and in sequence through first web means, the body intermediate extent and finally second web means. More importantly from the standpoint of efficiency of load segregation and load bearing ability for a given sized unit, the first and second web means are made to extend in substantially longitudinal planes which are spaced from the body longitudinal axis, extensions of these planes having substantially perpendicularly intersecting relation lengthwise along that axis. In addition, the first and second web means each comprise a pair of webs, the webs of each pair typically but not necessarily having concave opposite faces, and preferably all of the webs have minimum thickness in or proximate a common plane perpendicular to the body longitudinal axis. As a result, the web means are adapted to flex in response to application to the body ends of moments acting in longitudinal planes, and in such manner that substantially only axial loading is transmitted in use through the device, the overall load handling capacity being optimized for a given size device.

Of particular advantage is the one-piece construction which the device may have due to the novel arrangement of slots, webs and recesses all of which will be discussed in detail, with consequent elimination of need for welds particularly in primary load paths or critical areas of the device. Other advantages flowing from the novel arrangement of webs, slots and recesses include the reduction of manufacturing difficulties, the fixing of pivot or flexing axes in a common plane, the ability of the device to carry rather large lateral forces which are applied such as not to produce bending moments about the pivot axes, the predetermination of the web design to be characterized as associated with the ability of the webs to carry greater axially imposed loading without buckling, as opposed to other designs not so characterized, and finally the ability of the device to carry torsion moments.

These and other objects of the invention, as well as the details of an illustrative embodiment, will be more fully understood from the following detailed description of the drawings, in which:

FIG. 1 is a plan view of a preferred embodiment, looking parallel to the longitudinal axis thereof;

FIG. 2 is a side elevation view of FIG. 1 embodiment;

FIG. 3 is another side elevational view of the FIG. 1 embodiment rotated 90° relative to FIG. 1, and about the body axis;

FIG. 4 is an enlarged section taken on line 4—4 of FIG. 3;

FIG. 5 is an enlarged section taken on line 5—5 of FIG. 2;

FIG. 6 is a view showing the manner in which devices of the FIG. 1 type may be connected in load transmitting relation between a source of loading and meters or load sensing devices;

FIGS. 7 and 8 are side elevational views like FIGS. 3 and 2, showing a modified form of the invention;

FIG. 9 is a top plan view of the FIG. 7 body; and

FIGS. 10 and 11 are enlarged sections taken on lines 10—10 and 11—11 of FIGS. 7 and 8 respectively.

Referring first to FIG. 6, the elastic pivot 10 is shown as connected in axial load transmitting relation between the load source 11 and the meter 12. Axial loading is indicated by the arrow 13, it being understood that lateral loading in other directions may be imposed, arrow 14 being merely typical of one direction of imposed lateral loading. The load source might typically represent a rocket on a test stand, with the arrow 13 representing forces arising due to the axial thrust loading imposed during rocket firing. It would then be desired that the meter 12 measure such loading as distinguished from lateral loading 14 arising during rocket operation. Another elastic pivot 10a is shown at the axially opposite side of the meter 12, and other elastic pivots 10b and 10c are shown as connected in lateral load transmitting relation to meter 12a which measures lateral loading 14.

Referring now to FIGS. 1 through 5, the unit 10 comprises a body, typically of one-piece construction, having opposite ends 15 and 16 which are longitudinally spaced apart in the direction of the body axis 17 to receive application of force. Such force may be transmitted to and from the body by threaded fastening means typically in the form of threaded studs 18 and 19 respectively projecting axially oppositely from the opposite ends of the body.

The body also has first and second web means respectively indicated at 20 and 21 in FIGS. 3 and 2, as well as body intermediate extent 23 for transmitting the bulk of axially imposed force between the body ends and in sequence through the first web means 20 as indicated by the arrow 24, then through the body intermediate extent as indicated by the arrows 25 in FIG. 3, and then through the second web means 21 as indicated by the arrow 26 in FIG. 2. As shown in FIG. 5, the first web means may typically but not necessarily comprise a first pair of webs 27 which are spaced apart at opposite sides of the body longitudinal axis 17, and the second web means may typically but not necessarily comprise a second pair of webs 28 spaced apart at opposite sides of the axis 17. The two webs 27 extend in a common plane having an extension 29 which intersects the axis 17 along its length, and also the two webs 28 extend in a common plane having an extension 30 which intersects the axis 17 as well as the extension 29. In other words, the extensions 29 and 30 have substantially perpendicularly intersecting relation lengthwise along the axis 17 as shown in FIG. 5. In this regard, it will be observed in FIGS. 2, 3 and 4 that the body means has rigid beam portions 31 and 32 through which loading is transmitted between the body opposite ends 15 and 16 and the web means 20 and 21.

Further in connection with what has been described, the one-piece construction of the body is facilitated by the provision of four pairs of recesses 33, the recesses of each pair being located at transversely opposite sides of a web such as has been described. These recesses extend from the cylindrical outer side of the body to the body interior where they intersect as best seen in FIG. 4.

Furthermore, the recesses are each generally cylindrical, and are confined between a pair of longitudinally spaced apart parallel planes 34 and 35 perpendicular to the axis 17 as seen in FIGS. 2 and 3. Thus, the recesses have equal longitudinal extent, and the recesses of each pair are so formed that the web between the recesses has minimum thickness between concave opposite faces such as are shown at 36 and 37 in FIG. 3. Accordingly, a common plane 44 perpendicular to the axis 17 intersects the webs at or near their minimum thickness points, the plane 44 being typically but not necessarily equidistant from opposite ends 15 and 16 of the body.

The body also contains two pairs of slots, the first pair of slots being shown at 39 in FIG. 3, and the second pair being shown at 40 in FIG. 2. Slots 39 extend from the outside of the body near its end 15 into communication with the recesses 33 at opposite sides of the first web means 20, whereas the second pair of slots 40 extend from the outside of the body near its end 16 thereof into communication with the recesses 33 at opposite sides of the second web means 21. As shown, the slots 39 extend in planes which taper or converge generally toward the first web means 20, whereas the slots 40 extend in planes which taper or converge generally toward the second web means 21. Accordingly, the rigid beam portions 31 and 32 are formed between the respective pairs of slots 39 and 40. As a result of the aforesaid construction, advantage is taken of that design which is associated with the ability of the web means to carry maximum axial loading without buckling. At the same time, it will be observed that the webs are adapted to flex in response to application to the body ends of moments acting in longitudinal planes parallel to the body axis 17.

Referring now to FIGS. 2 through 4, it will be seen that a pair of stop members, as for example pins 41, extend transversely and in parallel relation through bores 42 formed in the rigid beam portions 32, with clearance between the pins and the bores. The end portions of the pins are retained within the body intermediate extent 23 at transverse opposite sides of the portion 32. As a result, pivoting or deflection of the rigid beam portion 32, as accommodated by flexing of the web means 21, is stopped by engagement of the bores 42 with the pins 41 before such deflection closes either of the slots 40. A corresponding pair of pin members 43 are shown in FIG. 3 as extending through bores 44 in the rigid beam section 31, with clearance between these pin members and bores 44. The function of the pins 43 is the same as described in connection with pins 41, that is to stop deflection of the section 31 as accommodated by flexing of the web means 20, before such deflection closes either of the slots 39. Alternately, the clearances may be enlarged to permit closure of the slots before stopping on the pins, the pins then serving as safety devices to prevent complete separation of the end portions in the case of web failure.

FIG. 4 also shows a longitudinal central bore 45 through the fastening means 19 and extending beyond the central plane 44. This bore conveniently forms the central space at opposite sides of which the webs extend, as illustrated, and thereby facilitates one-piece manufacture of the device.

FIGS. 7–11 show a modified form of the invention in which the one-piece body 100 is in the form of a block, with rounded edges 101, and having larger and heavier sections 102 than appear in the FIG. 5 cross-section. As a result the body will handle greater loading. Also, the threaded fastening means 103 at one end of the body is in the form of an interiorly threaded sleeve. Note that the recesses 33 are spaced closer to body end 104 than body end 105, to facilitate the wider spacing between the terminals of slots 40 at body end 105 than between the terminals of slots 39 at body end 104, such wider spacing accommodating the larger chamber sleeve 103. Otherwise, the construction of the FIG. 7–11 device is like that the of the FIG. 1–6 device, with corresponding parts having the same numerals.

I claim:

1. An elastic pivot comprising body means having opposite ends longitudinally spaced apart in the direction of the body axis to receive application of force and having first and second web means and body intermediate extent proximate thereto for transmitting axially imposed force between said ends and in sequence through first web means, said body intermediate extent and second web means, said first and second web means extending in substantially longitudinal planes disposed substantially at right angles to each other and which are spaced from said axis, extensions of said planes having substantially perpendicularly intersecting relation with each other lengthwise along said axis, said web means being adapted to flex in response to application to said body ends of moments acting in longitudinal planes, the body containing transversely drilled substantially circular cross section recesses at opposite sides of each web means so that the web means have concave faces adjacent said recesses, the recesses at opposite sides of the first web means extending toward and terminating near the second web means so as to be interiorly blocked by the second web means, the other recesses at opposite sides of the second web means extending toward and terminating near the first web means so as to be interiorly blocked by the first web means.

2. The pivot of claim 1 in which the body means is of one piece and has rigid transverse beam portions through which loading is transmitted between said ends and said webs, the body means containing an axial bore penetrating from within one of said beam portions into a locus intermediate the inner terminals of both said first and second web means to completely free said locus of body material.

3. The pivot of claim 1 in which said first web means comprises a first pair of webs spaced apart at opposite sides of said axis, and said second web means comprises a second pair of webs spaced apart at opposite sides of said axis.

4. The invention as defined in claim 3 in which all of said webs have minimum thickness in a common plane perpendicular to said axis.

5. The invention as defined in claim 4 in which said common plane bisects said body midway between said opposite ends thereof.

6. The invention as defined in claim 3 in which the body contains two pairs of slots, the slots of the first pair extending from one end of said body into communication with the recesses at opposite sides of said first pair of webs, and the slots of the second pair extending from the opposite end of said body into communication with the recesses at opposite sides of said second pair of webs.

7. The invention as defined in claim 6, in which the body has transverse beam portions, and including fastening means respectively projecting axially oppositely from the transverse beam portions of the body between said pairs of slots.

8. The invention as defined in claim 7 in which the slots of each pair converge axially toward the recesses with which the slots communicate.

9. The invention as defined in claim 7 including members secured to body extent other than said transverse beam portions, said members extending into such proximity to said portions that deflection of a transverse beam portion will be stopped by at least one member before said deflection closes any slot adjacent said portion.

10. The pivot of claim 1 in which the body is of substantially block form.

References Cited

UNITED STATES PATENTS

| | | | |
|---|---|---|---|
| 2,966,049 | 12/1960 | Ormond | 287—85 XR |
| 2,969,656 | 1/1961 | Reuter | 287—85 XR |
| 3,169,613 | 2/1965 | Webb | 64—15 XR |

MARTIN P. SCHWADRON, *Primary Examiner.*

ROBERT R. BUNEVICH, *Assistant Examiner.*